---

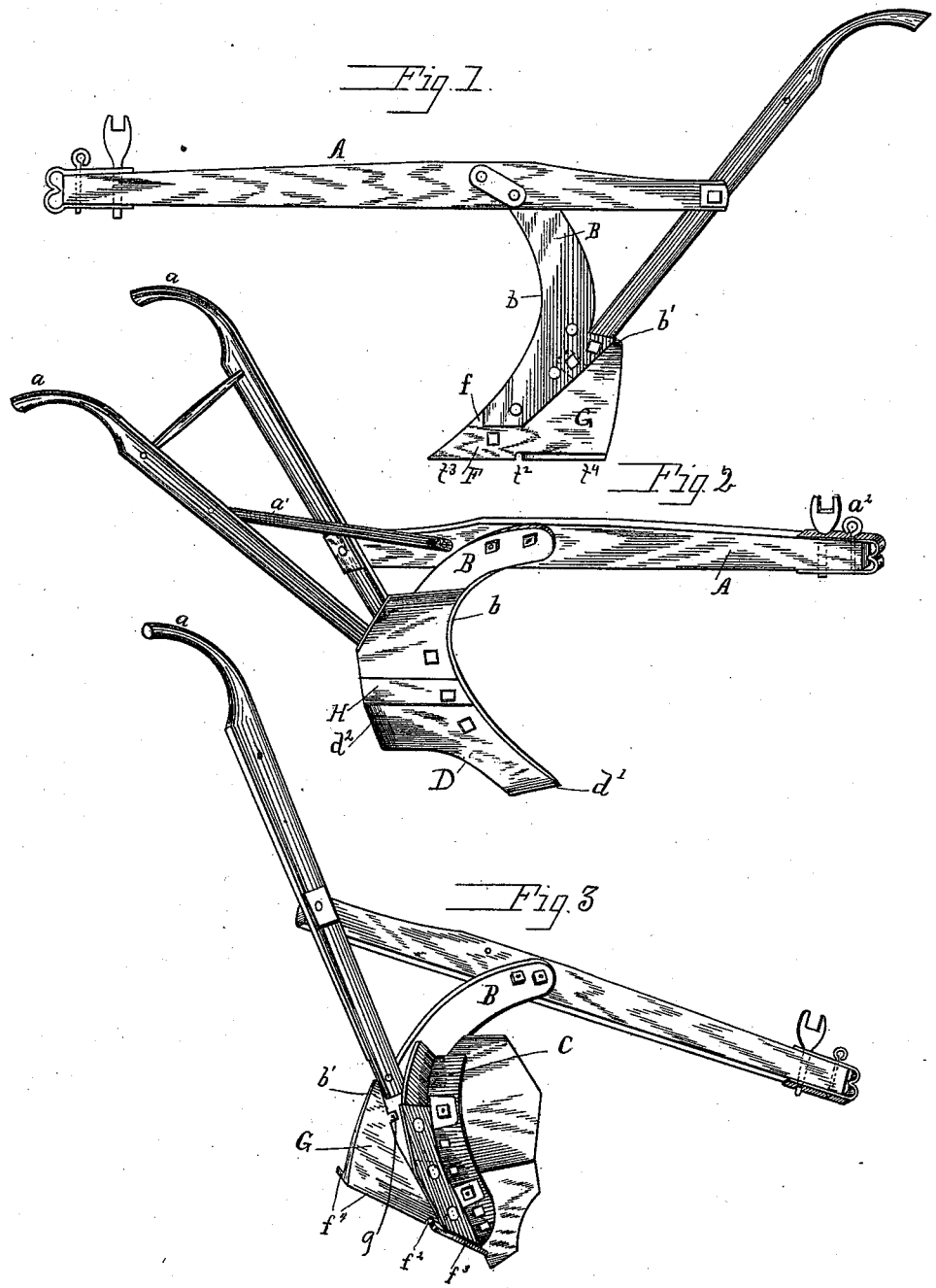

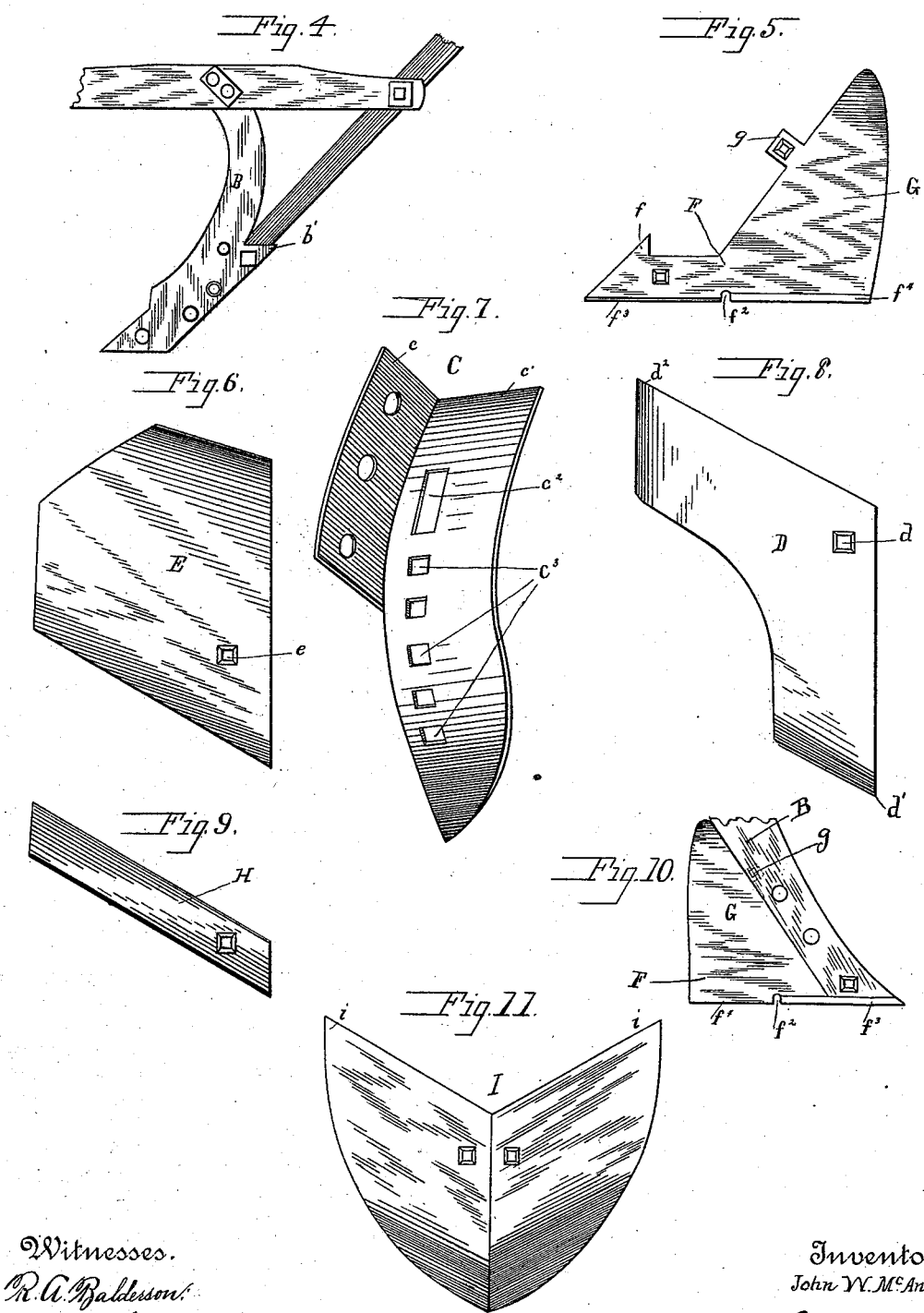

UNITED STATES PATENT OFFICE.

JOHN WILSON McANULTY, OF CONCORD, NORTH CAROLINA.

PLOW AND PLOW-POINT.

SPECIFICATION forming part of Letters Patent No. 400,581, dated April 2, 1889.

Application filed February 23, 1888. Renewed December 27, 1888. Serial No. 294,773. (No model.)

*To all whom it may concern:*

Be it known that I, JOHN WILSON MC-ANULTY, a citizen of the United States, residing at Concord, in the county of Cabarrus and State of North Carolina, have invented certain new and useful Improvements in Plows and Plow-Points; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to plows; and it consists in the novel construction and arrangement of its parts, hereinafter described, and set out in this specification and the claims.

In the accompanying drawings, Figure 1 is an elevation of the left-hand side of my invention. Fig. 2 is an elevation of the right-hand side of the same. Fig. 3 is a rear perspective view of the same. Figs. 4, 5, 6, 7, 8, 9, 10, and 11 are detail views.

My invention is described as follows:

In the accompanying drawings, A represents the beam; $a$, the handles; $a'$, the brace to hold the handles steady and in place. $a^2$ represents the clevis-iron, pin, and wrench.

B represents the foot of the plow, which may be wrought or cast. It is curved and sharpened on its point edge, forming a sharp edge, $b$, to cut the turf and roots and throw the dirt to the wing. There is an elbow, $b'$, on the rear edge of this foot as a seat for the lower ends of the handles.

To the right face of foot B is secured, by bolts or otherwise, a seat or share, C, the short wing $c$ being secured to said foot, while the long wing $c'$ stands out almost at right angles with the said foot, and is perforated by a slot, $c^2$ and square holes $c^3$. To the lower end of said share is secured the plow-point D, which has one square perforation, $d$, in its corner corresponding to the perforations $c^3$ in said share, and is secured to said share by means of a square bolt passing through said perforations. Just above the said plow-point D is secured the wing E, which is bolted to said share by a bolt passing through its square perforation $e$ and the slot $c^2$. To the lower end of the foot B is secured a landside, F. The point of this landside is flush with edge $b$ of the said foot, and is sharpened to correspond with said edge, and is so cut that the front joint, $f$, is perpendicular, so that grass or weeds may not be caught in the same. The base of this landside has cut in it, about equidistant from each end, a notch, $f^2$. The front end of the base $f^3$ is turned in, or to the right, and the rear end, $f^4$, is turned out, or to the left. This landside has a wing, G, which extends up at the rear of the foot until its upper end is flush with the elbow $b'$, and is secured to said foot by a bolt passing through its arm $g$ and a perforation in said foot. The said plow-point D is a movable invertible reversible self-sharpening point, which is the chief feature of this plow. As the point at $d'$ becomes dull, the point at $d^2$ is being sharpened by use, the dirt passing over it as it is thrown to the right; and when the point $d'$ becomes too dull for use, instead of stopping work to have the plow sharpened, I turn over the said point, bring the point $d^2$ down and turn the point $d'$ up. The said two points are exactly the same distance from the perforation $d$, and they are exactly the same, the point $d'$ being turned forward a little and the point $d^2$ being turned back a little, so that when the two points change position and the point $d^2$ is brought down its point stands forward a little, while the point $d'$ stands back a little, and it will be seen that this point may be reversed, first wearing off one point, then the other, dulling and sharpening said points alternately until they become too short for use. As this wearing process is going on, the said plow-point is gradually let down from the upper perforation, $c^3$, in the share C to the lower perforation of the same, and for the first move or two of the said point the wing E is brought down correspondingly, its bolt passing through slot $c^2$ of said share; but when it is brought down as low as it can come, and moving the point D still lower would leave an opening between the two pieces, I introduce between them a section, H. This is a combination-plow. It is either a right or left hand turning plow—one or two horses. It is also a cultivator, subsoiler, or a center or sweep plow.

When I wish to use it as a right-hand plow, the share C will be placed on the right-hand side of the foot. When I wish to use it as a left-hand plow, a left-hand share, similar to the one above described, is secured on the left-hand side of said foot, and a left-hand point-wing and section H, similar to the ones above described, are secured to said left-hand share. When I wish to use it as a center shovel or sweep, I use the two shares—one on each side—and the two wings—one on each side—and instead of the point D, I use a center point, I, having right and left wings $i$.

Having thus described my invention, what I claim as new, and desire to secure by Letters Patent, is—

1. The combination, with the beam A and handles $a$, of curved foot B, having the sharp edge $b$ and elbow $b'$, landside F, its front end sharp and flush with the said edge $b$, the front half of its base, $f^3$, turned in and its rear half, $f^4$, turned out, its wing G extending up and secured to said foot, share C, having the short perforated wing $c$ and long slotted and perforated wing $c'$, movable invertible reversible self-sharpening point D, and movable wing E, substantially as shown and described.

2. The combination, with the beam A and handles $a$, of curved foot B, having the sharp edge $b$ and elbow $b'$, landside F, its front end sharp and flush with the said edge $b$, the front half of its base, $f^3$, turned in and its rear half, $f^4$, turned out, its wing G extending up and secured to said foot, share C, having the short perforated wing $c$ and long slotted and perforated wing $c'$, movable invertible reversible self-sharpening point D, movable wing E, and section H, substantially as shown and described.

3. The combination, with the beam A and handles $a$, of curved foot B, having the sharp edge $b$ and elbow $b'$, landside F, its front end sharp and flush with the said edge $b$, the front half of its base, $f^3$, turned in and its rear half, $f^4$, turned out, its wing G extending up and secured to said foot, share C, having the short perforated wings $c$ and long slotted and perforated wings $c'$, movable wings E, and sweep I, having the wings $i$, substantially as shown and described.

In testimony whereof I affix my signature in presence of two witnesses.

JOHN WILSON McANULTY.

Witnesses:
RICHARD WHITE,
MORRISON CALDWELL.